US009678914B2

United States Patent
Bass et al.

(10) Patent No.: US 9,678,914 B2
(45) Date of Patent: Jun. 13, 2017

(54) HOT REMOVING AN I/O MODULE WITH MULTIPLE HOT PLUG SLOTS

(71) Applicant: International Business Machines Corporation, Armonk, NY (US)

(72) Inventors: Robert H. Bass, Raleigh, NC (US); Ryuji Orita, Redmond, WA (US); Mehul M. Shah, Austin, TX (US); Timothy M. Wiwel, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 453 days.

(21) Appl. No.: 14/184,138

(22) Filed: Feb. 19, 2014

(65) Prior Publication Data

US 2015/0234768 A1    Aug. 20, 2015

(51) Int. Cl.
G06F 13/20    (2006.01)
G06F 13/40    (2006.01)
G06F 9/44    (2006.01)

(52) U.S. Cl.
CPC ........ *G06F 13/4081* (2013.01); *G06F 9/4411* (2013.01); *G06F 9/4413* (2013.01)

(58) Field of Classification Search
CPC ......... G06F 13/4081; G06F 2213/0024; G06F 9/4411; G06F 9/4413
See application file for complete search history.

(56) References Cited

U.S. PATENT DOCUMENTS

| | | | |
|---|---|---|---|
| 6,363,452 B1 * | 3/2002 | Lach | G06F 13/4081 710/302 |
| 7,146,447 B2 * | 12/2006 | Chari | G06F 9/4411 710/302 |
| 7,200,694 B2 | 4/2007 | Yakovlev et al. | |
| 7,305,497 B2 | 12/2007 | Houdek et al. | |
| 7,321,947 B2 | 1/2008 | Gupta et al. | |
| 7,610,429 B2 | 10/2009 | Muppirala et al. | |
| 7,673,082 B2 | 3/2010 | Muppirala et al. | |
| 7,689,751 B2 | 3/2010 | Feehrer | |
| 7,836,238 B2 | 11/2010 | Freimuth et al. | |

(Continued)

OTHER PUBLICATIONS

PCI SIG, "PCI Hot-Plug 1.1", Copyright 2013 PCI-SIG, retrieved on Nov. 26, 2013 from website: <http://pcisig.com/specifications/conventional/pci_hot_plug/>.

(Continued)

*Primary Examiner* — Ernest Unelus
(74) *Attorney, Agent, or Firm* — Jeffrey L. Streets

(57) ABSTRACT

In a method for ejecting a plurality of hot plug slots sharing a power controller, a processor receives a request to eject a plurality of hot plug slots, wherein the plurality of hot plug slots share a power controller and have at least two adapters present. A processor causes an OS to incrementally eject the at least two adapters, wherein ejecting an adapter comprises the OS stopping at least one driver of the adapter, and the OS generating a request to remove power from a hot plug slot. Responsive to a request by the OS to remove power from a hot plug slot, a processor generates a signal that prevents the OS from recognizing the adapter is present in the hot plug slot. Responsive to all device drivers for the at least two adapters being stopped, a processor causes power to be removed from the plurality of hot plug slots.

11 Claims, 4 Drawing Sheets

(56) References Cited

U.S. PATENT DOCUMENTS

2004/0243725 A1* 12/2004 Yakovlev ............ G06F 13/4081
710/1
2012/0290764 A1 11/2012 Higuchi et al.

OTHER PUBLICATIONS

Wikipedia, "Fan-out", From Wikipedia, the free encyclopedia, retrieved on Nov. 26, 2013 from website: <http://en.wikipedia,org/w/index.php?title=Fan-out>.

* cited by examiner

… (1) …

HOT REMOVING AN I/O MODULE WITH MULTIPLE HOT PLUG SLOTS

FIELD OF THE INVENTION

The present invention relates generally to the field of hot plugging, and more particularly to enabling and/or disabling multiple I/O slots that share a power source.

BACKGROUND OF THE INVENTION

Hot plugging is a term used to describe the function of replacing, adding, or removing computer system components without shutting down the system. Hot plugging may be used whenever it is desirable to change the configuration or repair a working system without interrupting its operation. Hot plugging may also be used for the convenience of avoiding the delay and nuisance of shutting down and restarting complex equipment, such as a server, which aims to be continually active. Hot plugging may be used to add or remove peripherals or components, to allow a device to synchronize data with a computer, and to replace faulty modules without interrupting equipment operation.

SUMMARY

Aspects of an embodiment of the present invention disclose a method, computer program product, and computing system for ejecting a plurality of hot plug slots sharing a power controller. A processor receives a request to eject a plurality of hot plug slots, wherein the plurality of hot plug slots share a power controller and have at least two adapters present. A processor causes an operating system (OS) to incrementally eject the at least two adapters present in the plurality of hot plug slots, wherein ejecting an adapter present in a hot plug slot comprises the OS stopping at least one driver of the adapter, and the OS generating a request to remove power from the hot plug slot. Responsive to a request by the OS to remove power from a hot plug slot of the plurality of hot plug slots, a processor generates a signal that prevents the OS from recognizing that the adapter is present in the hot plug slot. Responsive to all device drivers for each of the at least two adapters present in the plurality of hot plug slots being stopped, a processor causes power to be removed from the plurality of hot plug slots.

DETAILED DESCRIPTION

Figure 1:
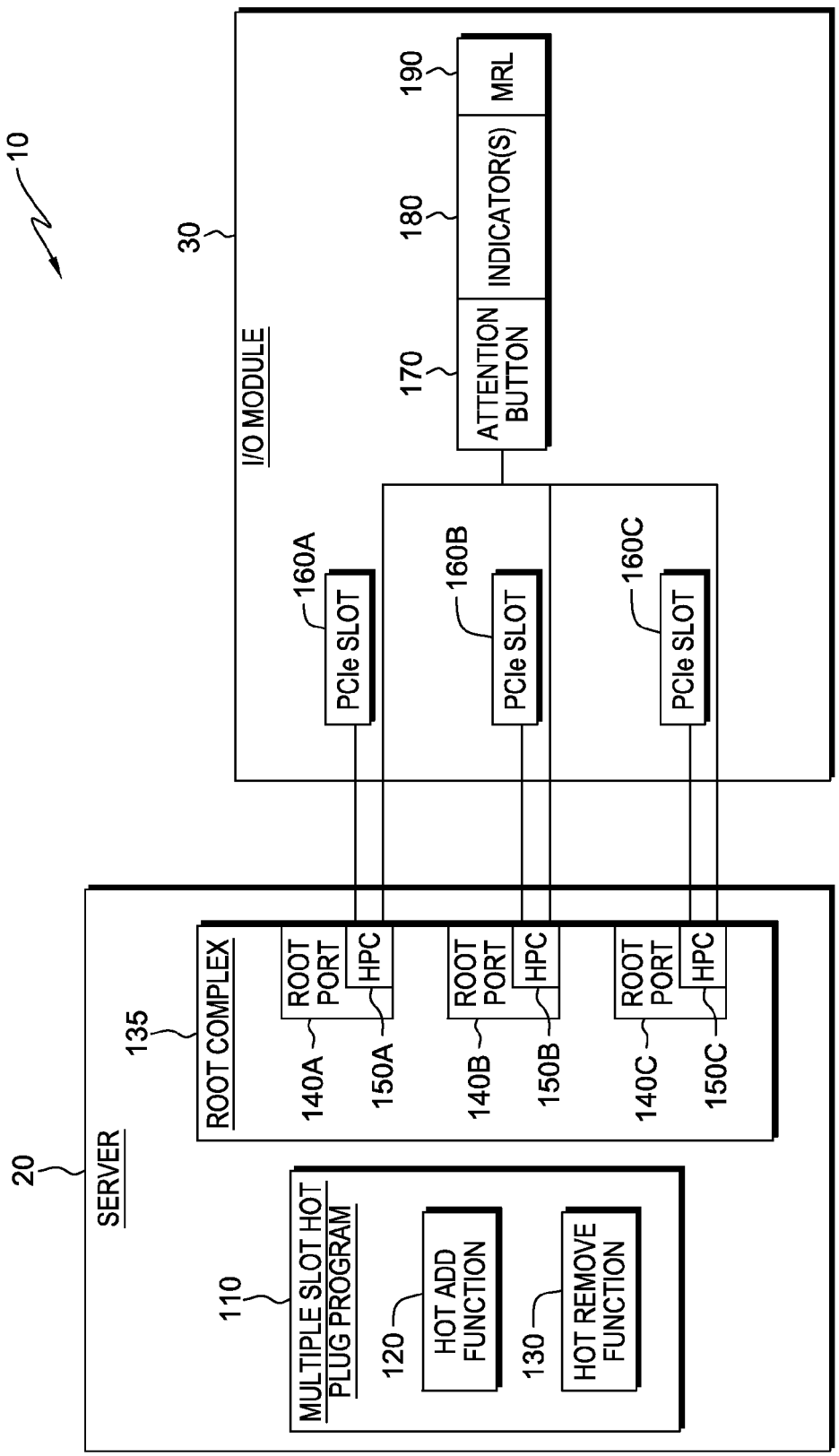
FIG. 1 depicts a diagram of a computing system, in accordance with one embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The present invention will now be described in detail with reference to the Figures.

FIG. 1 depicts a diagram of computing system 10, in accordance with one embodiment of the present invention. FIG. 1 provides only an illustration of one embodiment and does not imply any limitations with regard to the environments in which different embodiments may be implemented.

In the depicted embodiment, computing system 10 includes server 20 and input/output (I/O) module 30. In the depicted embodiment, I/O module 30 is connected to server 20. Computing system 10 may include additional computing devices, servers, computers, modules, or other devices not shown.

Server 20 may be a management server, a web server, or any other electronic device or computing system capable of processing computer program instructions and receiving and sending data. In some embodiments, server 20 may be a laptop computer, tablet computer, netbook computer, personal computer (PC), a desktop computer, a personal digital assistant (PDA), a smart phone, or any programmable electronic device capable of communicating with I/O module 30 and any attached devices, such as peripheral component interconnect express (PCIe) adapters in PCIe slots 160A-160C. An adapter may be a hardware device or software component that converts transmitted data from one presentation form to another. Expansion cards typically implement some kind of adapter. Server 20 may contain multiple slot hot plug program 110, hot add function 120, and hot remove function 130. In the depicted embodiment, server 20 includes root complex 135. Root complex 135 includes root ports 140A-140C and hot plug controllers (HPCs) 150A-150C. In some embodiments, server 20 may include a field-programmable gate array (FPGA) (not shown), or other integrated circuits. An FPGA is an integrated circuit designed to be configured after manufacturing. FPGAs may be used to implement logical functions and perform digital computations. In some embodiments, a FPGA may be configured to implement the functionality of multiple slot hot plug program 110, hot add function 120, and/or hot remove function 130. Server 20 may include additional component, as depicted and described in further detail with respect to FIG. 4.

Root complex 135 is a component of server 20 that connects the processor and memory subsystem of server 20 to the PCIe fabric. Root complex 135 generates transaction requests on behalf of the processor, which is interconnected through a local bus. Root complex 135 may include some combination of a capabilities register, status register, and control register to facilitate hot plug operations. The capabilities register may be configured to store information relating to the capabilities and operational features that are implemented for the PCIe device and the parameters necessary to their operation. A capabilities register may also store additional information, such as link width and speed supported by the hardware. A status register may include information regarding the current settings or status of each slot, including the status of attention button 170, card present status, and power fault status. A control register may include information for setting/controlling power, clock, reset, indicator(s) 180, and other functions for each slot. Root complex 135 may support one or more PCIe ports. In the depicted example, root complex 135 includes root ports 140A-140C. Each of root ports 140A-140C include a hot plug controller (HPC), see HPCs 150A-150C. Root complex 135 may include any number of root ports and HPCs. In some embodiments, root complex 135 is implemented as a discrete device. In other embodiments, root complex 135 may be integrated with the processor or with the chipset.

HPCs 150A-150C may each be included to facilitate hot plug operations associated with multiple slot hot plug program 110, hot add function 120, and/or hot remove function 130. HPCs 150A-150C may each be configured to support hot plug operations that enable PCIe devices to be plugged into a slot without requiring a reboot if a PCIe device attaches to a slot having the features necessary to enable hot plug, such as PCIe slots 160A-160C on I/O module 30. HPCs 150A-150C may each be configured to read and write information to the registers described with regard to root complex 135. Generally, if a hot plug event occurs, the respective HPC indicates the information (i.e., the hot plug event status) on the registers and issues an interrupt to the processor. Hot plug events may include indications that the attention button has been pressed, or that a power fault has been detected. The information included in the registers can be manipulated according to the operation associated with the interrupt. In the depicted illustration, each of PCI slots 160A-160C correspond to respective root ports 140A-140C and respective HPCs 150A-150C (e.g., PCIe slot 160A is connected to root complex 135 via root port 140A and hot plug operations are facilitated by HPC 150A).

Multiple slot hot plug program 110 operates to enable hot plug capabilities for an I/O module, such as I/O module 30, that includes a plurality of PCIe slots, such as PCI slots 160A-160C, and a single attention button 170. In some embodiments, multiple slot hot plug program 110 includes hot add function 120 and hot remove function 130. In one embodiment, multiple slot hot plug program 110 resides on server 20. In some embodiments, multiple slot hot plug program 110 resides within root complex 135.

Hot add function 120 operates to hot add, or initiate without rebooting, PCIe slots and associated PCIe cards located on an I/O module, such as PCIe slots 160A-160C and PCIe cards on I/O module 30, in accordance with embodiments of the present invention. After receiving a single indication, such as an indication generated by a user selecting attention button 170, hot add function 120 may cause each of PCI slots 160A-160C, and associated PCIe cards within PCIe slots 160A-160C, to be hot added to expand or otherwise enhance server 20. In some embodiments, the functionality of hot add function 120 may be embodied as firmware.

Hot remove function 130 operates to hot remove, or eject without a need to reboot the system, PCIe slots and associated PCIe cards located on an I/O module, such as PCIe slots 160A-160C and PCI cards on I/O module 30, in accordance with embodiments of the present invention. After receiving a single indication, such as an indication generated by a user selecting attention button 170, hot remove function 130 may cause the operating system of server 20, each of HPC 150A-150C, and other necessary software and/or hardware components to hot remove PCIe cards located on PCIe slots 160A-160C. Once hot remove function 130 has caused all cards to be put into a reset state, hot remove function 130 may also cause the power to be removed from each of slots 160A-160C, allowing for the potential removal of I/O module 30 from server 20 and computing system 10. In some embodiments, the functionality of hot remove function 130 may be embodied as firmware.

I/O module 30 may be a modular component configured to attach to server 20. I/O module 30 may include one or more I/O expansion slots. In the depicted embodiment, I/O module 30 includes PCIe slots 160A-160C. Each of PCIe slots 160A-160C are hot plug capable. In some embodiments, I/O module 30 may include a greater or fewer number of PCIe slots. In some embodiments, I/O module 30 may include hot plug capable slots of a different input type. I/O module 30 includes attention button 170, indicator(s) 180, and manually-operated retention latch (MRL) 190.

In some embodiments, attention button 170 is a physical button located on I/O module 30, communicatively connected to each HPC of HPCs 150A-150C. In other embodiments, attention button 170 may be a virtual button accessed through an interface on a computing device, such as server 20. Generally, attention button 170 is used by a user to initiate a hot addition or hot removal of PCIe slots located on I/O module 30, such as PCIe slots 160A-160C. In embodiments of the current invention, attention button 170 is used to hot add or hot remove all PCIe slots on I/O module 30, i.e., PCIe slots 160A-160C. Indicator(s) 180 may indicate the power and attention state of each slot, or all of the slots located on I/O module 30. In some embodiments, indicator(s) 180 may be physical lights located on or near I/O module 30. In other embodiments, indicator(s) 180 may be virtual indicators located on the display of a computing device, such as server 20. In some embodiments, MRL 190 may be used to hold PCIe cards in place, or alternatively, to hold I/O module 30 in place and operatively attached to server 20 within computing system 10. MRL 190 may include an MRL sensor which allows HPCs 150A-150C to detect the MRL being opened or closed. An MRL sensor may be a switch, optical device, or other type of sensor that reports the position of a slot's MRL to HPCs 150A-150C.

Figure 2:
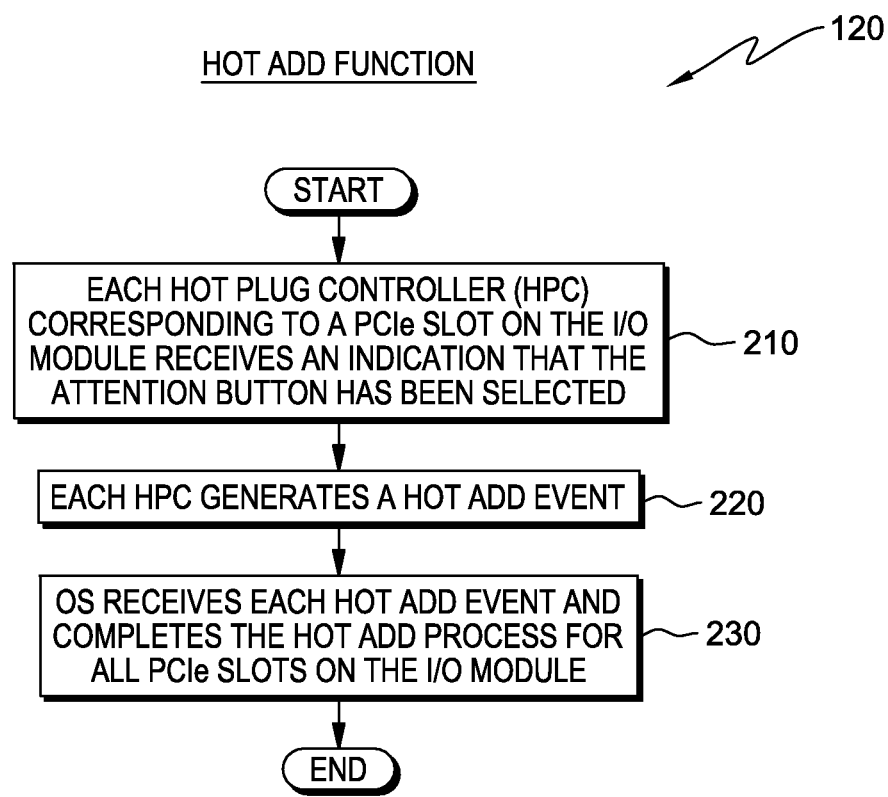
FIG. 2 depicts a flowchart of the steps of a hot add function executing within the computing system of FIG. 1, for hot adding a plurality of hot plug slots on a connected input/output (I/O) module, in accordance with one embodiment of the present invention.

FIG. 2 depicts a flowchart of the steps of hot add function 120, a function of multiple slot hot plug program 110, executing within the computing system of FIG. 1, in accordance with an embodiment of the present invention. Hot add function 120 operates to coordinate the hot add process on all of the PCIe slots located on I/O module 30 (i.e., PCIe slots 160A-160C, as depicted in FIG. 1), in accordance with one embodiment of the present invention.

In one embodiment, initially, a user may physically insert or otherwise attach I/O module 30 to server 20. I/O module 30 may include one or more PCIe cards inserted into any of PCIe slots 160A-160C. I/O module 30 may also include attention button 170, wherein attention button 170 is wired to act as an attention button for all PCIe slots (i.e., PCIe slots 160A-160C) on I/O module 30.

In step 210, each of HPCs 150A-150C receives an indication that attention button 170 has been selected. As previously discussed, attention button 170 may be a physical button or virtual selection option on a display or interface. In some embodiments, the indication may be generated by a combination of the manually operated retention latch (MRL) being closed and attention button 170 being selected.

In step 220, responsive to receiving the indication, each of HPCs 150A-150C generate a hot add event for each respective PCIe slot of PCIe slots 160A-160C. The hot add event may include instructions to power on the respective slot of PCIe slots 160A-160C, to locate devices on each respective slot of PCIe slots 160A-160C, as well as instructions to configure and load applicable drivers for devices on each respective slot of PCIe slots 160A-160C. In some embodiments each respective hot plug controller, such as each of HPCs 150A-150C, may perform steps associated with the hot add event. In some embodiments, HPCs 150A-150C each send respective generated hot add events to the operating system (OS) of server 20 for completion of the hot add process.

In step 230, the OS of server 20 receives the hot add event and completes the hot add process for all applicable devices on PCIe slots 160A-160C. Completing the hot add process may include locating and configuring each device and associated drivers for the device(s) located on PCIe slots 160A-160C. In some embodiments, the OS may activate indicator(s) 180 to indicate the slot is active. For example, indicator(s) 180 may be a light or series of lights that turn on to indicate that power is being provided to the slot and any PCIe adapters connected to the slot are active.

Figure 3:
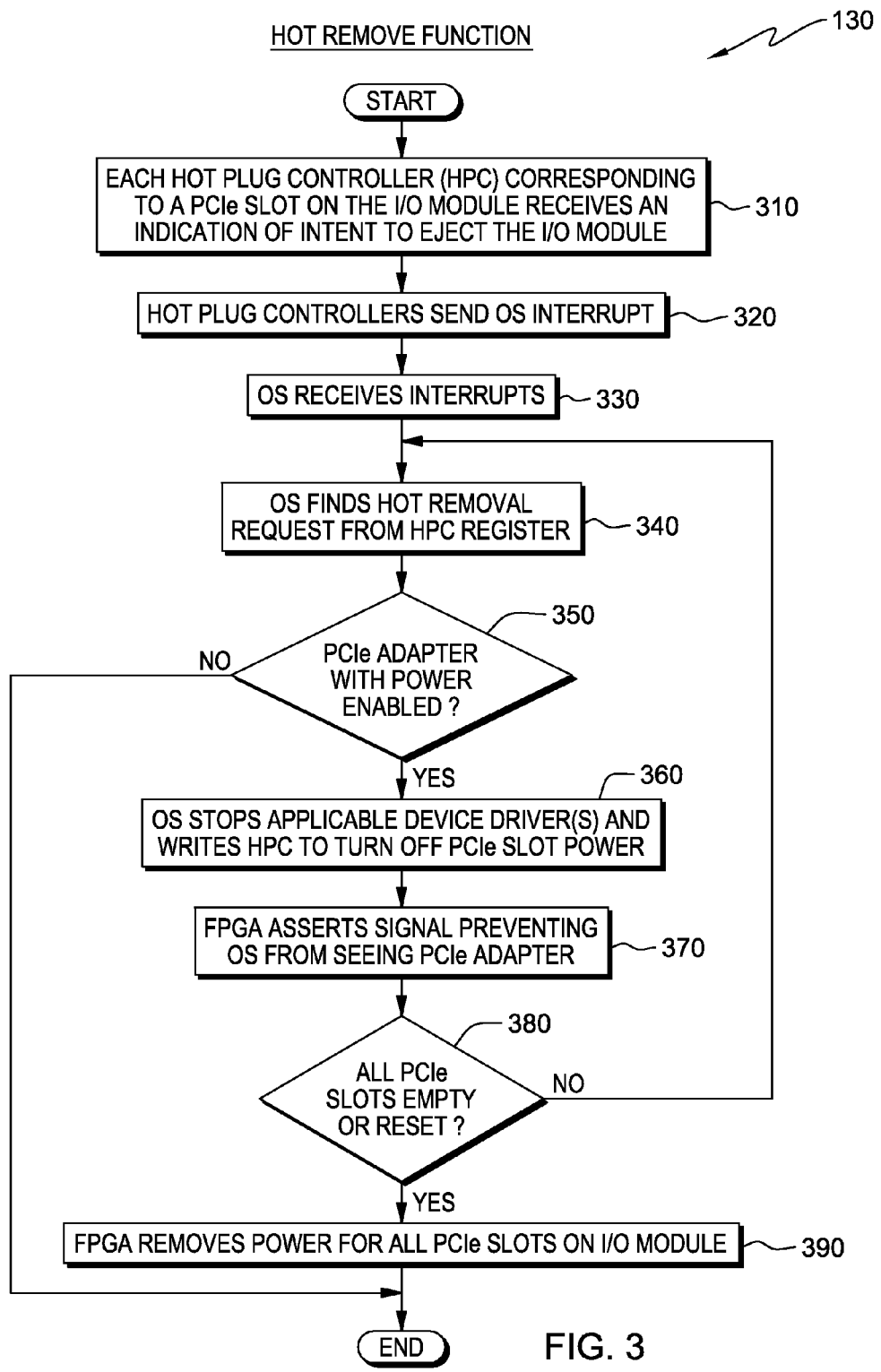
FIG. 3 depicts a flowchart of the steps of a hot remove function executing within the computing system of FIG. 1, for hot removing a plurality of hot plug slots on a connected I/O module, in accordance with one embodiment of the present invention.

FIG. 3 depicts a flowchart of the steps of a hot remove function 130, a function of multiple slot hot plug program 110, executing within the computing system of FIG. 1. Hot remove function 130 operates to coordinate the process for hot removing multiple PCI slots on an I/O module, such as PCI slots 160A-160C on I/O module 30, in accordance with one embodiment of the present invention.

In one embodiment initially, one or more PCIe adapters, or PCIe cards, are operatively connected to server 20. Each PCI adapter may be connected to server 20 through one of PCIe slots 160A-160C.

In step 310, each HPC corresponding to a PCIe slot on the I/O module, such as HPCs 150A-150C receive an indication of intent to eject the respective PCIe slot. In embodiments of the present invention, the indication is generated when a user presses attention button 170. As previously discussed, attention button 170 may be a physical button or a virtual selectable element on a computer display or interface.

In step 320, each applicable HPC, such as each of HPCs 150A-150C, generates an interrupt that is sent to the OS of server 20. An interrupt is a signal to the processor of a computing device indicating an event that needs immediate attention. HPCs 150A-150C may each store a request for hot removal to a register accessible by the OS of server 20.

In step 330, the OS of server 20 receives notification of the interrupt. Upon receipt of the notification, the OS of server 20 may access the register associated with each of HPCs 150A-150C to retrieve each applicable request for hot removal for the respective devices and PCIe slots 160A-160C (step 340). Typically, the OS of server 20 will retrieve one request for hot removal at a time, and the OS of server 20 may be unable to perform all requests simultaneously. As such, the OS of server 20 may perform steps 350 and 360, as described below, incrementally for each applicable request for hot removal for each PCIe slot of PCI slots 160A-160C.

In decision 350, the OS of server 20 determines if there is at least one PCIe adapter in any of PCIe slots 160A-160C that has the power enabled. If PCIe slots 160A-160C do not have power enabled (decision 350, no branch), the function is complete. If PCIe slots 160A-160C have power enabled (decision 350, yes branch), the OS of server 20 will stop applicable device drivers for the PCIe adapter located in the respective slot of PCIe slots 160A-160C (step 360). As may be natively programmed to the OS of server 20, the OS of server 20 may also write the respective HPC of HPCs 150A-150C to turn off power to the respective PCI slot of PCIe slots 160A-160C. However, embodiments of the present invention PCIe slots 160A-160C may share a power controller. If power is removed from a PCIe adapter before respective drivers have been stopped, and before the PCIe adapter is in a reset state, the operation of computing system 10, and more specifically server 20, could be compromised.

In step 370, an FPGA (not shown), located on server 20 asserts a signal preventing the OS of server 20 from seeing, or otherwise recognizing, the respective PCIe adapter, even if power continues to be provided to the respective slot of PCIe slots 160A-160C. In one embodiment, the FPGA may assert the PERST# signal for the respective slot. PERST# (PCI Express Reset, asserted low), is a signal that indicates fundamental reset by a PCIe port. In some embodiments, the functionality provided by the FPGA may be integrated through the use of software, firmware, or possibly through the use of another type of device or integrated circuit.

In decision 380, FPGA determines if all PCIe slots on the I/O module, such as PCI slots 160A-160C on I/O module 30, are empty or if applicable PCIe adapters have been reset. If FPGA determines there are additional PCIe adapters that have not been reset (decision 380, no branch), the OS of server 20 will continue to sequentially disable drivers associated with each PCIe adapter in each PCIe slot (see steps 340-370). If FPGA determines all of PCIe slots 160A-160C are empty or associated PCIe adapters have been reset (decision 380, yes branch), FPGA will cause the power controller for PCIe slots 160A-160C to remove power from each of PCIe slots 160A-160C (step 390). In embodiments of the present invention, the OS of server 20 will indicate, using indicator(s) 180, that the power has been removed from each slot. Once power has been removed, a user at server 20 may be able to physically remove I/O module 30.

Figure 4:
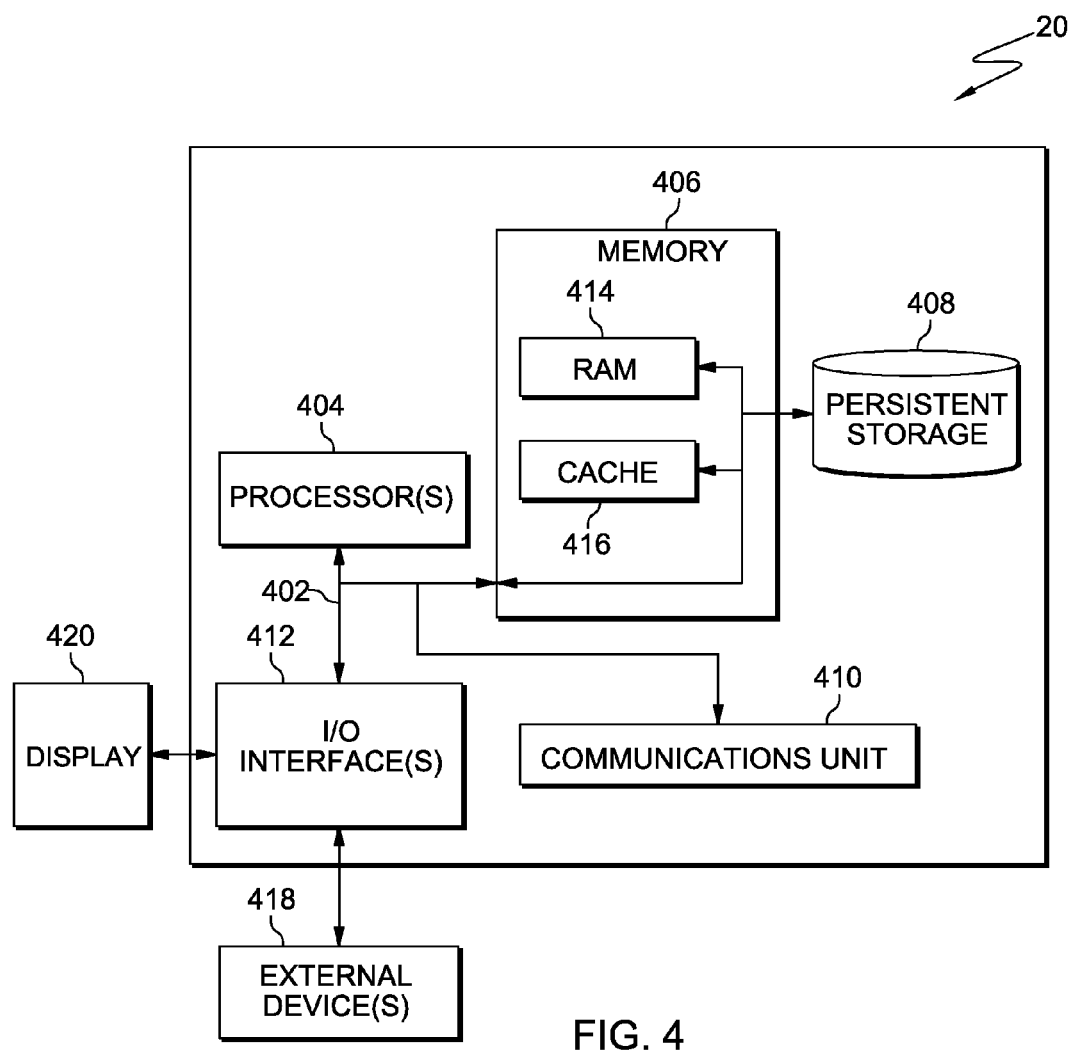
FIG. 4 depicts a block diagram of components of the server, in accordance with one embodiment of the present invention.

FIG. 4 depicts a block diagram of components of server 20, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 20 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

In some embodiments, multiple slot hot plug program 110, hot add function 120, and hot remove function 130 are stored in persistent storage 408 for execution by one or more of the respective computer processors 404 via one or more memories of memory 406. In other embodiments, aspects of multiple slot hot plug program 110, hot add function 120, and/or hot remove function 130 are stored in the FPGA or other external memory accessible by the FPGA (not shown). In some embodiments, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Multiple slot hot plug program 110, hot add function 120, and hot remove function 130 may be downloaded to persistent storage 408 through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., multiple slot hot plug program 110, hot add function 120, and hot remove function 130, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method comprising:
receiving, by one or more processors, a request to eject a plurality of hot plug slots from an attention button included on a removable module, wherein the plurality of hot plug slots share a power controller, have at least two adapters present, and are located on the removable module;
receiving, by a plurality of hot plug controllers which control the plurality of hot plug slots, a signal from the attention button;
instructing, by one or more processors, an operating system to eject the at least two adapters present in the plurality of hot plug slots, wherein ejecting an adapter present in a hot plug slot comprises the operating system stopping at least one driver of the adapter, and the operating system generating a request to remove power from the hot plug slot;
responsive to a request by the operating system to remove power from a hot plug slot of the plurality of hot plug slots, generating, by one or more processors, a signal that prevents the operating system from recognizing that the adapter is present in the hot plug slot; and
responsive to all device drivers for each of the at least two adapters present in the plurality of hot plug slots being stopped, causing power to be removed from the plurality of hot plug slots.

2. The method of claim 1, wherein each hot plug slot of the plurality of hot plug slots is a PCIe slot.

3. The method of claim 1, wherein the signal is a PERST# signal.

4. The method of claim 1, further comprising:
each hot plug controller sending an interrupt to the operating system in response to receiving a signal from the attention button; and
the operating system obtaining a hot removal request from a register of one of the hot plug controllers in response to receiving the interrupt.

5. A computer program product comprising:
one or more non-transitory computer readable storage media and program instructions stored on the one or more non-transitory computer readable storage media, the program instructions are executable by a processor, the program instructions comprising:
program instructions to receive a request to eject a plurality of hot plug slots from an attention button included on a removable module, wherein the plurality of hot plug slots share a power controller, have at least two adapters present, and are located on a removable module;
program instructions to receive, by a plurality of hot plug controllers which control the plurality of hot plug slots, a signal from the attention button;
program instructions to instruct an operating system to eject the at least two adapters present in the plurality of hot plug slots, wherein ejecting an adapter present in a hot plug slot comprises the operating system stopping at least one driver of the adapter, and the operating system generating a request to remove power from the hot plug slot;
program instructions to, responsive to a request by the operating system to remove power from a hot plug slot of the plurality of hot plug slots, generate a signal that prevents the operating system from recognizing that the adapter is present in the hot plug slot; and
program instructions to, responsive to all device drivers for each of the at least two adapters present in the plurality of hot plug slots being stopped, cause power to be removed from the plurality of hot plug slots.

6. The computer program product of claim 5, wherein each hot plug slot of the plurality of hot plug slots is a PCIe slot.

7. The computer program product of claim 5, wherein the signal is a PERST# signal.

8. The computer program product of claim 5, further comprising:
program instructions to instruct each hot plug controller to send an interrupt to the operating system in response to receiving a signal from the attention button; and
program instructions to instruct the operating system to obtain a hot removal request from a register of one of the hot plug controllers in response to receiving the interrupt.

9. A computer system comprising:
one or more processors, one or more computer readable memories, one or more computer readable storage media, and program instructions stored on at least one of the one or more computer readable storage media for execution by at least one of the one or more processors via at least one of the one or more computer readable memories, the program instructions comprising:
program instructions to receive a request to eject a plurality of hot plug slots from an attention button included on a removable module, wherein the plurality of hot plug slots share a power controller, have at least two adapters present, and are located on a removable module;
program instructions to receive, by a plurality of hot plug controllers which control the plurality of hot plug slots, a signal from the attention button;
program instructions to instruct an operating system to eject the at least two adapters present in the plurality of hot plug slots, wherein ejecting an adapter present in a hot plug slot comprises the operating system stopping at least one driver of the adapter, and the operating system generating a request to remove power from the hot plug slot;
program instructions to, responsive to a request by the operating system to remove power from a hot plug slot of the plurality of hot plug slots, generate a signal that prevents the operating system from recognizing that the adapter is present in the hot plug slot; and program instructions to, responsive to all device drivers for each of the at least two adapters present in the plurality of hot plug slots being stopped, cause power to be removed from the plurality of hot plug slots.

10. The computer system of claim 9, wherein each hot plug slot of the plurality of hot plug slots is a PCIe slot.

11. The computer system of claim 9, wherein the signal is a PERST# signal.

* * * * *